United States Patent
Kanamori

(10) Patent No.: US 8,228,531 B2
(45) Date of Patent: Jul. 24, 2012

(54) CONTROL METHOD BY PRINTER UTILITY AND INFORMATION PROCESSING APPARATUS

(75) Inventor: Hideyuki Kanamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1160 days.

(21) Appl. No.: 11/770,163

(22) Filed: Jun. 28, 2007

(65) Prior Publication Data

US 2008/0007771 A1 Jan. 10, 2008

(30) Foreign Application Priority Data

Jul. 7, 2006 (JP) .................................. 2006-188696

(51) Int. Cl.
*G06F 3/12* (2006.01)
(52) U.S. Cl. ..................... 358/1.15; 358/1.13; 358/1.14; 710/17; 710/19; 710/100; 710/305; 710/313
(58) Field of Classification Search .............. 358/1.15, 358/1.14, 1.13; 710/17, 19, 100, 305, 313
See application file for complete search history.

(56) References Cited

U.S. PATENT DOCUMENTS

| | | | | |
|---|---|---|---|---|
| 5,580,177 A * | 12/1996 | Gase et al. | ....................... | 400/61 |
| 5,828,864 A * | 10/1998 | Danknick et al. | ................ | 703/24 |
| 5,943,503 A * | 8/1999 | Kai | ............................... | 708/833 |
| 6,825,944 B1 * | 11/2004 | Noda | ............................ | 358/1.15 |
| 2002/0163666 A1 * | 11/2002 | Iwata et al. | ................... | 358/1.15 |
| 2005/0179940 A1 * | 8/2005 | Konji et al. | .................... | 358/1.15 |
| 2005/0225789 A1 * | 10/2005 | Ferlitsch | ....................... | 358/1.13 |
| 2006/0114499 A1 * | 6/2006 | Sumita et al. | ................. | 358/1.15 |

FOREIGN PATENT DOCUMENTS

JP 10-301728 11/1998

* cited by examiner

*Primary Examiner* — Jacky X Zheng

(74) *Attorney, Agent, or Firm* — Fitzpatrick, Cella, Harper & Scinto

(57) ABSTRACT

A printer utility 06 determines, upon receiving an instruction to display the remaining amount of ink, whether the interface with the selected printer is busy. If not busy, a status is obtained using that interface, and the remaining amount of ink, which is a part of the status, is displayed. If busy, a nearest previous status of the printer is read if stored in a printer status storage unit 05, and the remaining amount of ink is displayed. If not stored, a nearest previous status of the printer is read if stored in a printer status storage unit 07, and the remaining amount of ink is displayed.

9 Claims, 13 Drawing Sheets

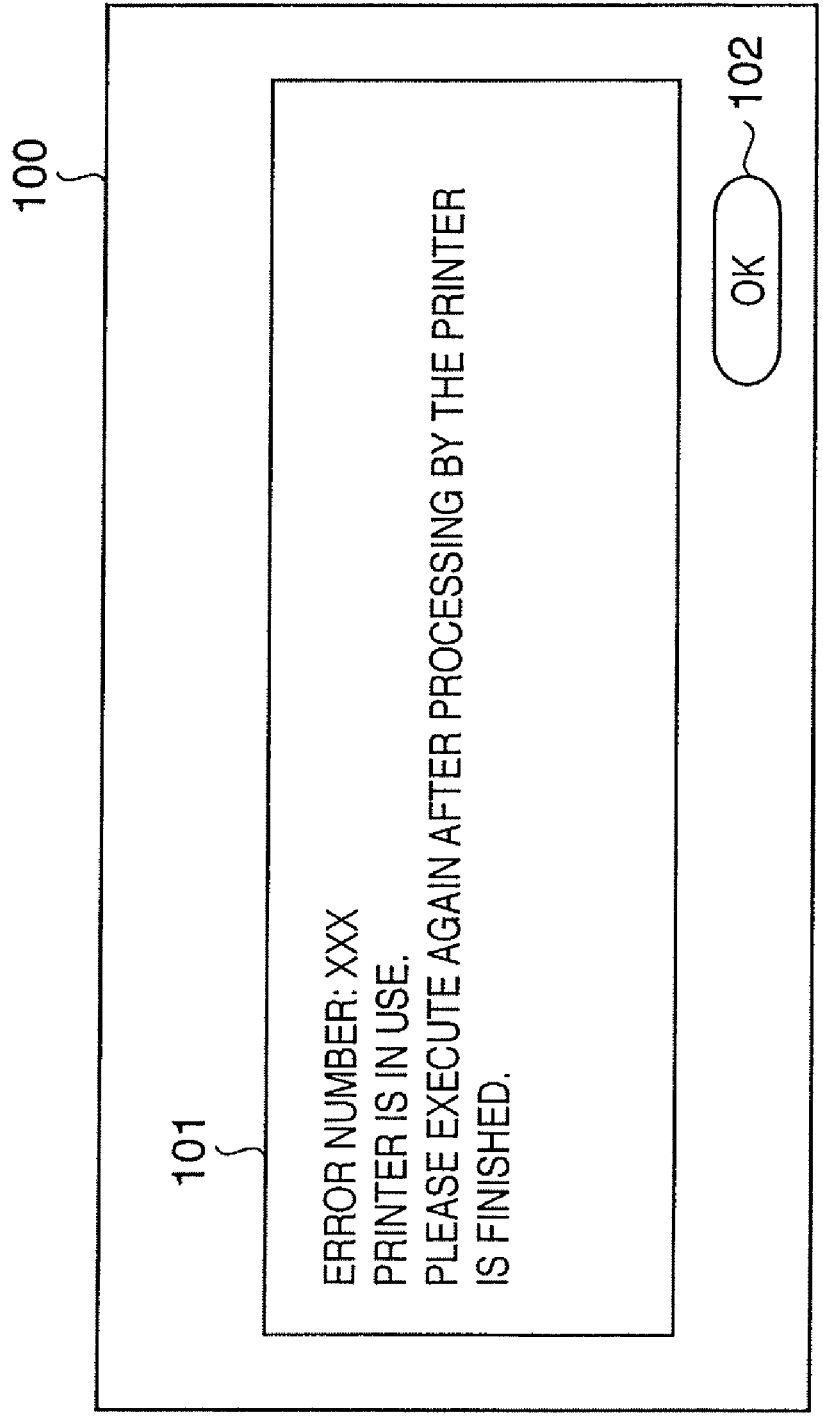

FIG. 10

| KEY(MODEL NAME) | VALUE(INFORMATION CORRESPONDING TO MODEL NAME) | | | |
|---|---|---|---|---|
| PRINTER A | KEY(COMMUNICATION I/F) | VALUE(INFORMATION CORRESPONDING TO COMMUNICATION I/F) | | |
| | USB | KEY(SERIAL NUMBER) | VALUE(VARIOUS INFORMATION) | |
| | | 000001 | KEY(ATTRIBUTE INFORMATION) | VALUE |
| | | | STATUS | A=50/B=40/C=30 |
| | | | SAVE TIME | 24 MAY 2006 1:55:59 |
| | | 000002 | KEY(ATTRIBUTE INFORMATION) | VALUE |
| | | | STATUS | A=25/B=10/C=0 |
| | | | SAVE TIME | 24 MAY 2006 10:05:08 |
| KEY(MODEL NAME) | VALUE(INFORMATION CORRESPONDING TO MODEL NAME) | | | |
| PRINTER B | KEY(COMMUNICATION I/F) | VALUE(INFORMATION CORRESPONDING TO COMMUNICATION I/F) | | |
| | USB | KEY(SERIAL NUMBER) | VALUE(VARIOUS INFORMATION) | |
| | | 000001 | KEY(ATTRIBUTE INFORMATION) | VALUE |
| | | | STATUS | A=90/B=40/C=80 |
| | | | SAVE TIME | 22 MAY 2006 17:10:18 |
| | ETHERNET | KEY(MAC ADDRESS) | VALUE(VARIOUS INFORMATION) | |
| | | 01.02.03.04.05.06 | KEY(ATTRIBUTE INFORMATION) | VALUE |
| | | | STATUS | A=30/B=60/C=80 |
| | | | SAVE TIME | 23 MAY 2006 15:30:28 |

FIG. 11

| KEY(MODEL NAME) | VALUE(INFORMATION CORRESPONDING TO MODEL NAME) | | | |
|---|---|---|---|---|
| PRINTER A | KEY(COMMUNICATION I/F) | VALUE(INFORMATION CORRESPONDING TO COMMUNICATION I/F) | | |
| | USB | KEY(SERIAL NUMBER) | VALUE(VARIOUS INFORMATION) | |
| | | 000001 | KEY(ATTRIBUTE INFORMATION) | VALUE |
| | | | BLACK INK LEVEL | 60% |
| | | | CYAN INK LEVEL | 50% |
| | | | MAGENTA INK LEVEL | 40% |
| | | | YELLOW INK LEVEL | 30% |
| | | 000002 | KEY(ATTRIBUTE INFORMATION) | VALUE |
| | | | BLACK INK LEVEL | 65% |
| | | | CYAN INK LEVEL | 50% |
| | | | MAGENTA INK LEVEL | 40% |
| | | | YELLOW INK LEVEL | 30% |

| KEY(MODEL NAME) | VALUE(INFORMATION CORRESPONDING TO MODEL NAME) | | | |
|---|---|---|---|---|
| PRINTER B | KEY(COMMUNICATION I/F) | VALUE(INFORMATION CORRESPONDING TO COMMUNICATION I/F) | | |
| | USB | KEY(SERIAL NUMBER) | VALUE(VARIOUS INFORMATION) | |
| | | 000001 | KEY(ATTRIBUTE INFORMATION) | VALUE |
| | | | BLACK INK LEVEL | 90% |
| | | | CYAN INK LEVEL | 40% |
| | | | MAGENTA INK LEVEL | 20% |
| | | | YELLOW INK LEVEL | 80% |
| | ETHERNET | KEY(MAC ADDRESS) | VALUE(INFORMATION CORRESPONDING TO COMMUNICATION I/F) | |
| | | 01.02.03.04.05.06 | VALUE(VARIOUS INFORMATION) | |
| | | | KEY(ATTRIBUTE INFORMATION) | VALUE |
| | | | BLACK INK LEVEL | 30% |
| | | | CYAN INK LEVEL | 65% |
| | | | MAGENTA INK LEVEL | 60% |
| | | | YELLOW INK LEVEL | 80% |

CONTROL METHOD BY PRINTER UTILITY AND INFORMATION PROCESSING APPARATUS

BACKGROUND OF THE INVENTION

1. Field of the Invention

The present invention relates to a printing system and more specifically to a configuration of obtaining the status of a printing apparatus.

2. Description of the Related Art

Conventionally, there is known a printing system with a printer driver which controls printing and a printer utility which controls printer maintenance, both of which are installed in a host computer. In this type of printing system, a user generates printing data by a printer driver and sends the printing data to a printer. On the other hand, there is known a printer utility which performs maintenance such as cleaning of the head of an inkjet printer or adjustment of the head's position, as well as checking the remaining amount of ink or battery in the printer (Japanese Patent Laid-Open No. 10-301728). The printer utility is executed by the host computer.

There are cases in which a printer utility and printer driver are or are not installed in a coupled manner in a printer system. For example, in certain operating systems such as operating systems of a Macintosh (Registered Trademark), the printer utility and printer driver are installed in the host computer as different modules. In such a case, when a user starts a printer utility and selects a desired function, the printer utility directly performs sending and receiving of data, and executes each type of process.

In the case that the printer utility and printer driver are installed as separate modules in the host computer, the printer driver opens the printer interface upon starting print processing, and performs sending and receiving of data with the printer. When print processing is finished, the interface is closed. During the time between the opening and closing of the interface, the interface is in an occupied state by the printer driver, and other processes cannot access the printer. Therefore, when the printer driver is executing print processing, the printer utility cannot communicate with a printer, and, for example, cannot obtain the status of the printer. For this reason, the user cannot check the remaining amount of ink or battery of the printer while in the middle of printing, nor the printer's operation mode.

SUMMARY OF THE INVENTION

The present invention was made in view of the above problems, and has as its object to enable the verification of a printer's status by a printer utility even while the printer driver is executing print processing.

In order to achieve the above object, the present invention has the following configuration. That is, the present invention is a control method executed by a printer utility, installed in an information processing apparatus with an operating printer driver which can obtain a status from a printing apparatus, having a function of obtaining a status from the printing apparatus, comprising a determination step of determining a state of an interface for obtaining a status from the printing apparatus; and an obtaining step of obtaining, if the interface in the determination step is not in an occupied state, a status of the printing apparatus via the interface, and obtaining, if the interface is determined to be in an occupied state in the determination step, a status of the printing apparatus obtained and stored by the printer driver.

According to the above configuration, even when printing a printer driver, the state of the printer can be confirmed by a printer utility.

Further features of the present invention will become apparent from the following description of exemplary embodiments (with reference to the attached drawings).

BRIEF DESCRIPTION OF THE DRAWINGS

FIG. 9 is a diagram showing an error notification screen.

FIG. 10 is a diagram showing the data structure of a status store file for the printer driver.

FIG. 11 is a diagram showing the data structure of an information store file for the printer utility.

DESCRIPTION OF THE EMBODIMENTS

<First Embodiment>

Figure 1:
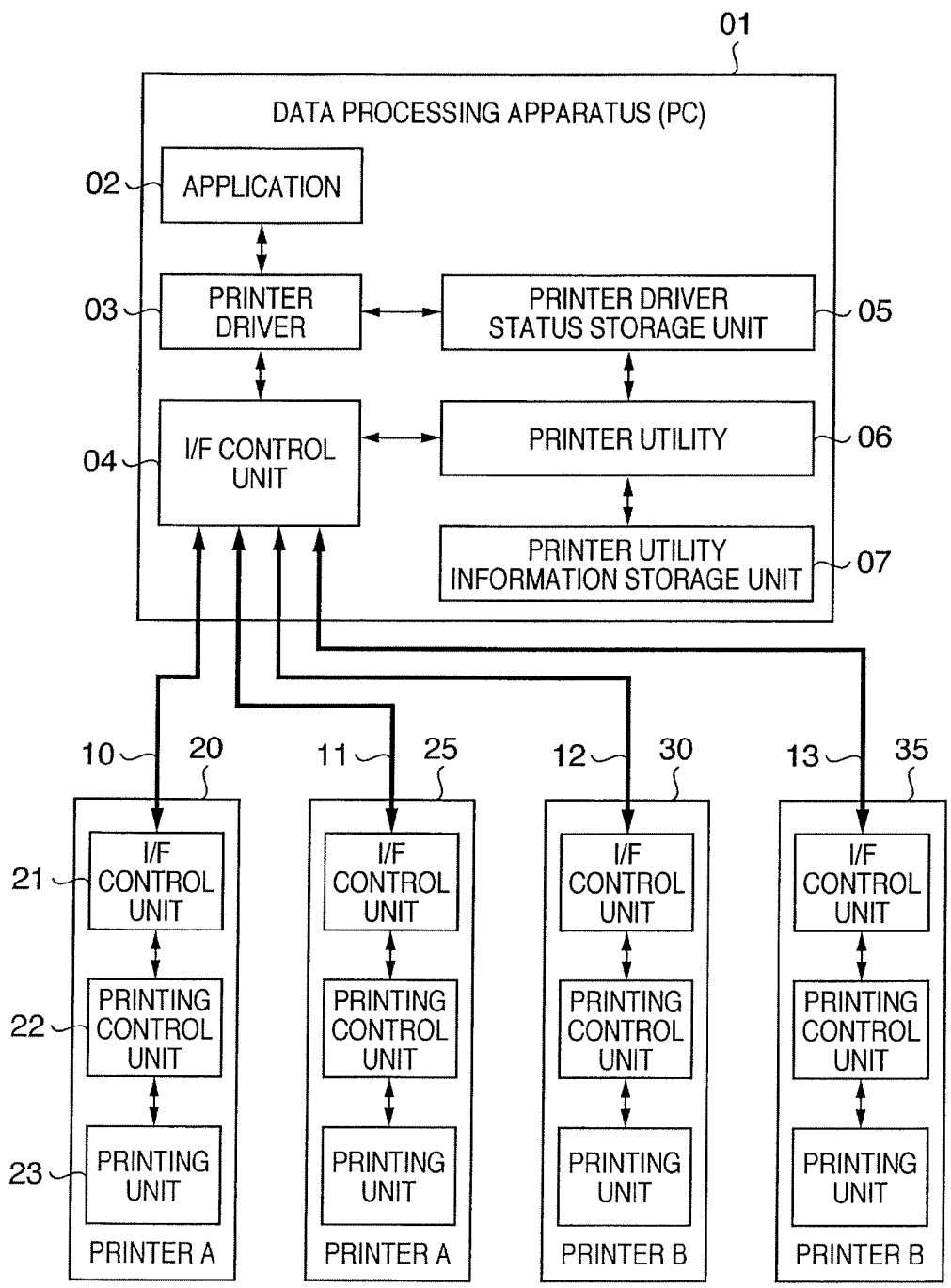
FIG. 1 is a diagram showing the configuration of a printing system according to an embodiment.

A first embodiment achieving the present invention will be described in detail with reference to the drawings. FIG. 1 is a diagram showing the configuration of the printing system according to a first embodiment of the present invention. In FIG. 1, a data processing apparatus 01 performs control of the printer. Here, the data processing apparatus 01 is a personal computer (abbreviated "PC" below) in which Mac OS (Registered Trademark) X has been installed as an operating system. The operating system is not shown in FIG. 1, but the resources of the PC 01 (for example, each block inside the PC 01) are managed by the operating system. Here, the PC 01 has the hardware configuration of a conventional information processing apparatus. Specifically, the PC 01 comprises a CPU, ROM, hard disk, RAM, and a variety of device controllers. The CPU executes a program such as an OS or an application stored in a ROM for programs or loaded into RAM from a hard disk. Moreover, the RAM functions as the main memory, work area, etc., of the CPU. In addition, the PC 01 has a disk controller (DKC), etc., for controlling data access by a keyboard, CRT display, and a hard disk (HD) or floppy disk (FD) for storing various data. Also, the PC 01 has a communication control unit, etc., for controlling the exchange of signals with a printer connected to the PC 01.

The PC 01 is configured with an application 02, a printer driver 03, an I/F (interface) control unit 04, a printer status storage unit 05, a printer utility 06, and a printer utility information storage unit 07. Of these, the application 02, the printer driver 03, and the printer utility 06 are software modules executed by the above-described CPU. When a user requests the printing of data constructed by the application 02, the printer driver 03 receives data constructed by the application 02, and, after exchanging printing data, sends the printing data via the I/F control unit 04 to the printer. Subsequently, the printer driver 03 monitors the status obtained from the printer. During this period, the printer driver 03 periodically stores in the printer status storage unit 05 the status obtained from the printer via the I/F control unit 04. On the other hand, the printer utility 06 sends, in response to the user, the control command to the printer via the I/F control unit 04. Moreover, the printer utility 06 displays the state of the printer based on the status obtained from the printer via the I/F control unit 04. The printer utility 06 stores information, which is based on the status obtained from a printer after executing various processing as required, in the printer utility information storage unit 07 managed by the printer utility 06 itself.

Since PC 01 is a computer, it is equipped with a CPU, a memory, a file storage, and human interfaces such as a display, a keyboard, etc. The printer driver 03 and the printer utility 06 are programs stored in the file storage, extracted to memory and executed by the CPU.

Communication interfaces 10, 11, 12, and 13 in FIG. 1 connect the PC 01 to printers 20, 25, 30, and 35, respectively. Here, a USB (Universal Serial Bus) interface is used for the communication interfaces 10, 11, and 12. The communication interface 13 is a communication network interface (LAN) such as Ethernet (Registered Trademark). In addition to this, wireless interfaces such as IEEE802.11, or FireWire (Registered Trademark) can be used. An interface (e.g., USB) which causes a PC to have exclusive control over a connected printer is called a local interface. In addition, there are no particular restrictions on printer type or number of printers connected. In FIG. 1, there are two of each of the inkjet printers called printer A and printer B. Both printers A are connected to the PC 01 via USB. On the other hand, one of printer B is connected to the PC 01 via USB, while the other printer B is connected to the PC 01 via Ethernet (Registered Trademark). Each printer comprises an I/F control unit 21, a printing control unit 22, and a printing unit 23. A printer performs, via the I/F control unit 21, such activities as receiving printing data and control command, and sending of printer status. The printing control unit 22 controls the printing unit 23 based on the printing data and control command sent from the PC 01.

<Print Processing by the Printer Driver>

Figure 2:
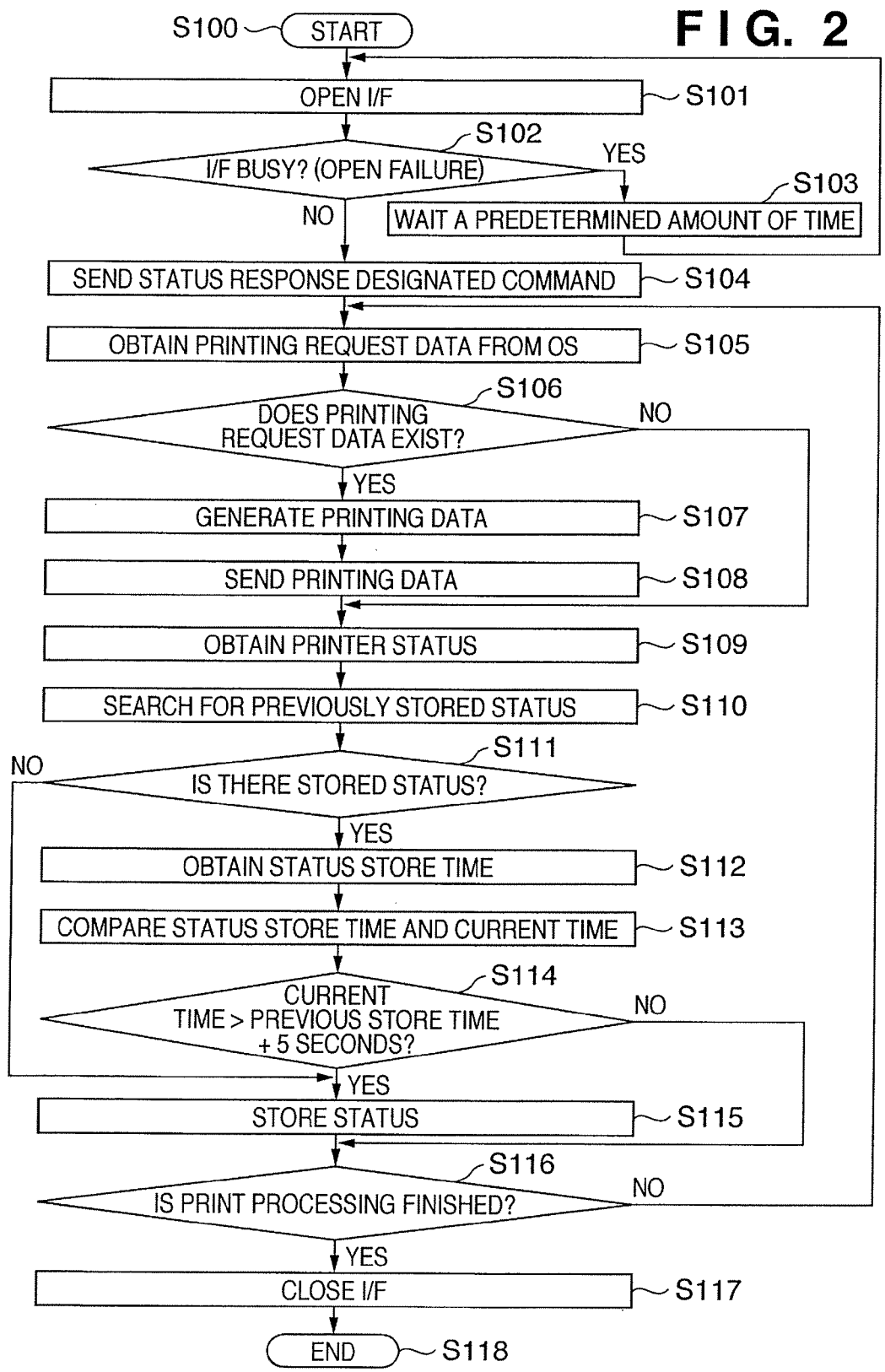
FIG. 2 is a diagram showing the flow of printer driver processing when printing.

FIG. 2 shows the processing flow of the printer driver 03 at the time of printing. At Step S101, opening of an interface with a printer to be operated is attempted.

At Step S102, it is determined whether the interface is in a busy state and open processing has failed. If it is determined that opening was not successful in the busy state, after waiting a pre-determined period of time (Step S103), the process returns to Step S101 and opening of the interface is retried. At Step S102, if it is determined that the interface is not in a busy state and that opening of the interface was successful, the process proceeds to Step S104.

When an interface is opened, that interface is put in an occupied state by the printer driver 03 until it is closed. Other software cannot be opened. For example, when another process attempts to open the interface during this occupied state, a value indicating that the interface is in a busy state is returned.

At Step S104, a command specifying a return status is sent to a printer. Next, at Step S105, data requested for printing by the application 02 is obtained from the operating system. At Step S106, when printing request data is determined to exist, printing data is generated based on obtained data (Step S107). Next, after sending to the printer (Step S108), the process advances to Step S109. On the other hand, if it is determined at Step S106 that printing request data does not exist, the process advances to Step S109.

At Step S109, the status is obtained from a printer. At Step S110, the status previously obtained from the printer and stored is searched for in the printer status storage unit 05. The printer driver 03 searches for the status corresponding to the search conditions (key) from within the printer status storage 05, based on the model name of the printer, communication interface, and value unique to the printer (serial number, etc.) By "search conditions", it is meant that the model name, communication interface, and value unique to the printer stored as parts of the status, match the model name, communication interface, and value unique to the printer connected by the interface opened at Step S101. Details of the search method will be described below.

In Step S111, if it is determined that there is a status (the status store file described below) corresponding to the search conditions, the store time stored together with the status is obtained (Step S112), and that stored time and the current time are compared (Step S113). At Step S114, it is determined whether 5 or more seconds have elapsed after saving the last status. If it is determined that 5 or more seconds have elapsed after saving the last status, the status obtained at Step S109 is stored in the printer status storage unit 05 (Step S115), and the process advances to Step S116. The obtained status is compared with the communication interface, value unique to the printer, and store time, and stored as a status store file. The storage time is the execution time of Step S115. In the present example, as the value unique to the printer, the following interface identifiers are used: the serial number is used in the case where the communication interface is a USB, the MAC address is used in the case where the communication interface is Ethernet (Registered Trademark), GUID is used in the case of IEEE1394, and so forth. GUID is an abbreviation for Global Unique ID. These interface identifiers make it possible to uniquely identify the interface. That is, the interface identifier serves as a key which makes it possible to uniquely identify the interface. The data structure of the status store file will be described below. In addition, if the status store file related to a printer for which a status has been obtained at Step S109 is already stored in the printer status storage unit 05, that status store file is overwritten by a new status store file. That is, if a status with the same printer model name, communication interface, and value unique to the printer is stored, that status and store time are stored.

On the other hand, if at Step S114 it is determined that less than 5 seconds have elapsed, the process advances to Step S116 without saving the status obtained at Step S109. In the present embodiment, whether or not to store the obtained status is determined based on whether the elapsed time after previously saving the status is greater than or equal to 5 seconds. However, the exact amount of time that is used as the basis for determination may be, for example, a different amount of time. Also, it can be configured such that, regardless of elapsed time, if the status has been obtained from a printer, a status is always stored. In that case, the determination at Step S114 is always "YES". In addition, instead of storing the status based on the amount of time elapsed from the time at which the status was stored, another valid approach is to compare the previously stored status and status obtained from the printer, and to store the status when the status has been changed. The status to be stored includes remaining ink information.

When it is determined that there is no relevant stored status at Step S111, the obtained status is stored (Step S115) and the process advances to Step S116. At Step S116, the process returns to Step S105 when it is determined that print processing is not finished, based on the status obtained from the printer. Once it is determined that print processing is finished, the process advances to Step S117, the interface is closed, and the process is ended.

<Printer Utility>

Figure 3:
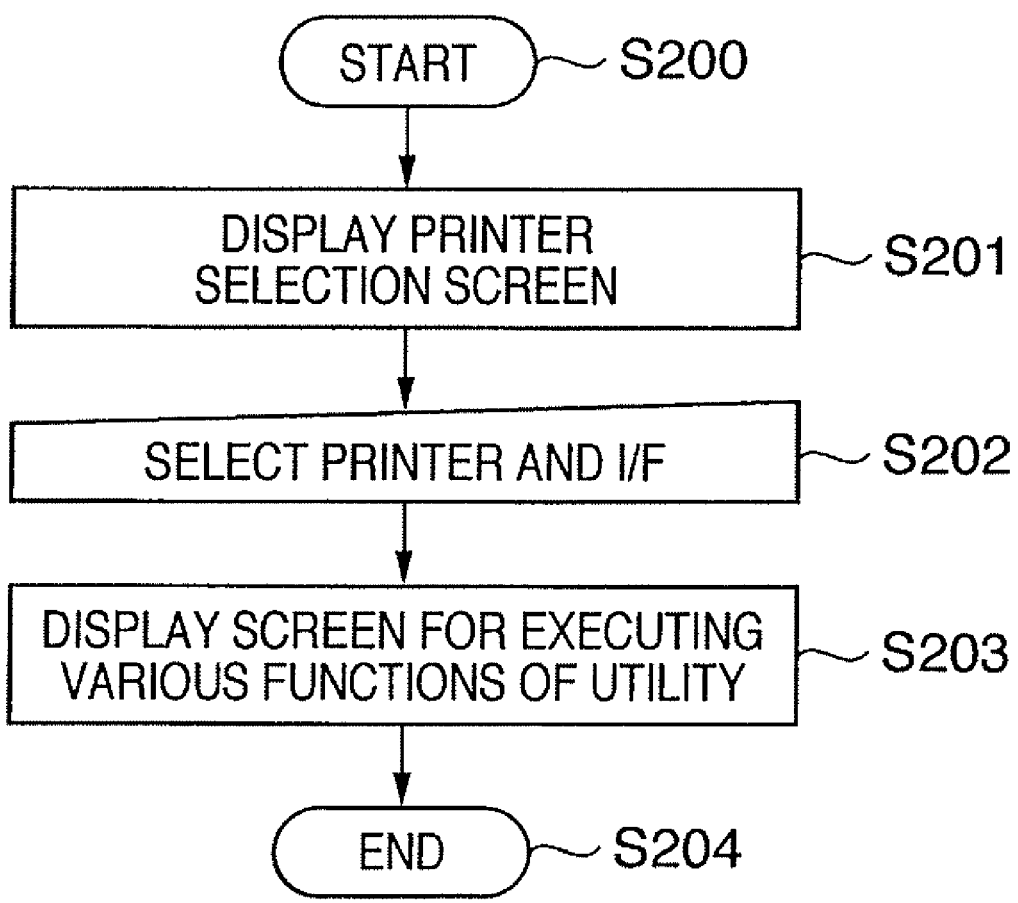
FIG. 3 is a diagram showing the flow of the process from start of a printer utility to display of an execution function selection screen.

FIG. 3 shows the processing flow until displaying the screen for the printer utility 06 to start up and execute various functions. When the user starts up the printer utility 06, the printer selection screen is displayed (Step S201). In this screen, printers connected to the PC 01 are listed for each communication interface. On this screen, the printer utility 06 receives the user's selection of communication interface and the selection of the printer that will be operated (Step S202). A detailed description of the present screen will be described below. Next, the process advances to Step S203, and when a screen for executing the various functions of the printer utility is displayed, startup processing is ended (Step S204). In the present screen, the user can execute cleaning or head position adjustment, display the state of the ink tank in the printer, or check the amount of remaining ink. The printer utility 06 receives the selection of functions to be executed by the user on that screen. A detailed description of the present screen will be provided below.

Figure 4:
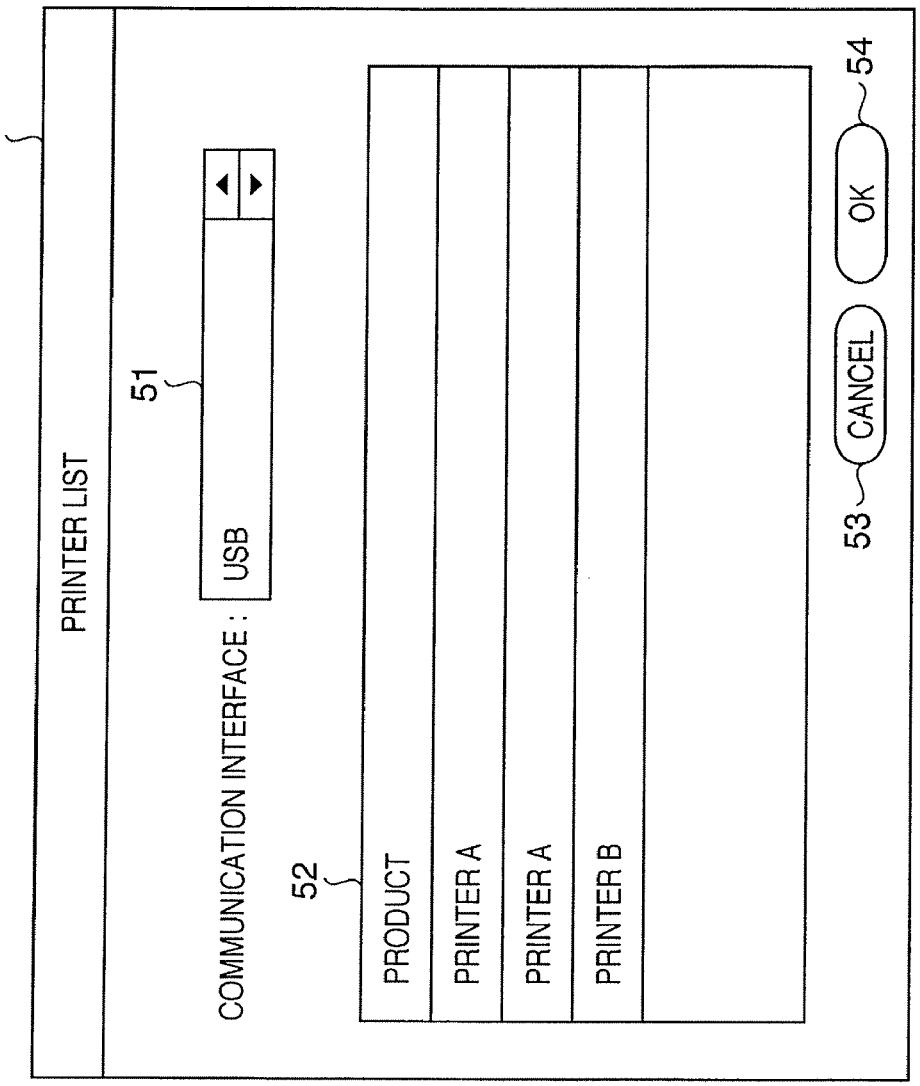
FIG. 4 is a diagram showing a printer selection screen of the printer utility.

FIG. 4 shows a printer selection screen displayed at Step S201 of FIG. 3. The printer selection screen 50 comprises a communication interface selection popup menu 51, a printer list display unit 52, a cancel button 53, and an OK button 54. A USB, Firewire, or LAN interface can be selected from the communication interface selection popup menu 51. On the printer list display unit 52 is displayed a printer connected to the PC 01 through a communication interface specified by the communication interface selection popup menu 51. A user may select, from among the displayed printers, one printer to be used.

When a USB is selected as an interface in the present embodiment, two of printer A and one of printer B are connected to the PC 01 through a USB cable and displayed on a printer list display unit 52. When a network is selected as an interface, one of printer B connected to the PC 01 through Ethernet (Registered Trademark) cable is displayed on a printer list display unit 52.

When a cancel button 53 is pressed, the printer utility 06 is ended. When an OK button 54 is pressed, a screen for executing the various functions of the printer utility 06 based on the selected printer is displayed. A detailed description of the present screen will be given below. The OK button 54 cannot be selected when a printer listed in the printer list display unit 52 is not selected.

Figure 5:
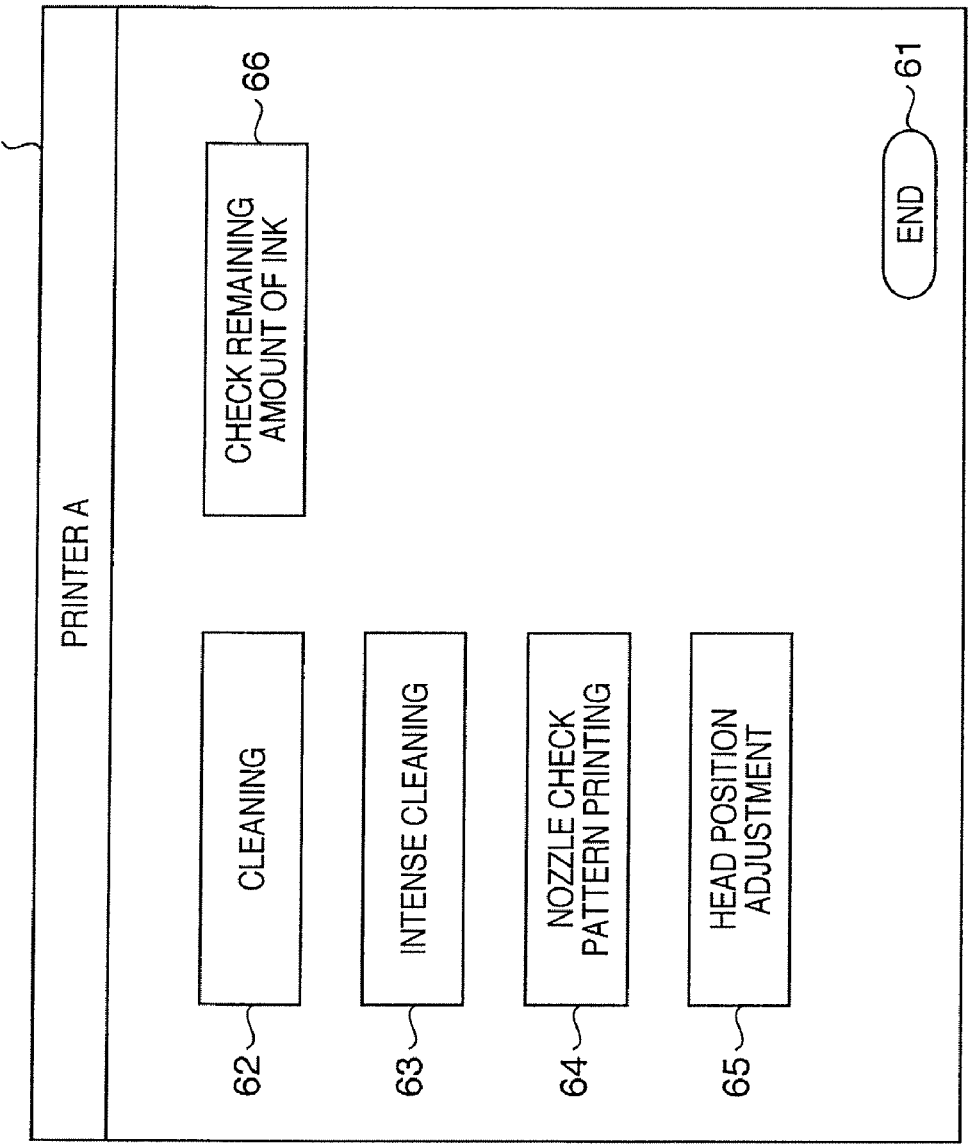
FIG. 5 is a diagram showing an executed function selection screen of the printer utility.

FIG. 5 is an execution function selection screen 60 for executing the various functions of the printer utility 06 displayed at Step S203 of FIG. 3. An execution function selection screen 60 comprises an end button 61, a cleaning execution button 62, an intense cleaning execution button 63, a nozzle check pattern printing execution button 64, a head position adjustment execution button 65, and a remaining ink checking execution button 66. When the end button 61 is pressed, the printer utility 06 is ended. When the cleaning execution button 62 is pressed, the printer utility 06 instructs the printer to carry out nozzle cleaning. When the intense cleaning execution button 63 is pressed, the printer utility 06 instructs the printer to carry out intense cleaning of the nozzle. When the nozzle check pattern printing execution button 64 is pressed, the printer utility 06 instructs the printer to carry out printing of a pattern so that the user can check the state of the nozzles. When the head position adjustment execution button 65 is pressed, the printer utility 06 instructs the printer to carry out printing of a pattern in order to fix the error in the mounting position of the print head. When the remaining ink checking execution button 66 is pressed, the printer utility 06 displays a screen for displaying the remaining amount of ink in the printer. A detailed description of the present screen will be given below.

Figure 6:
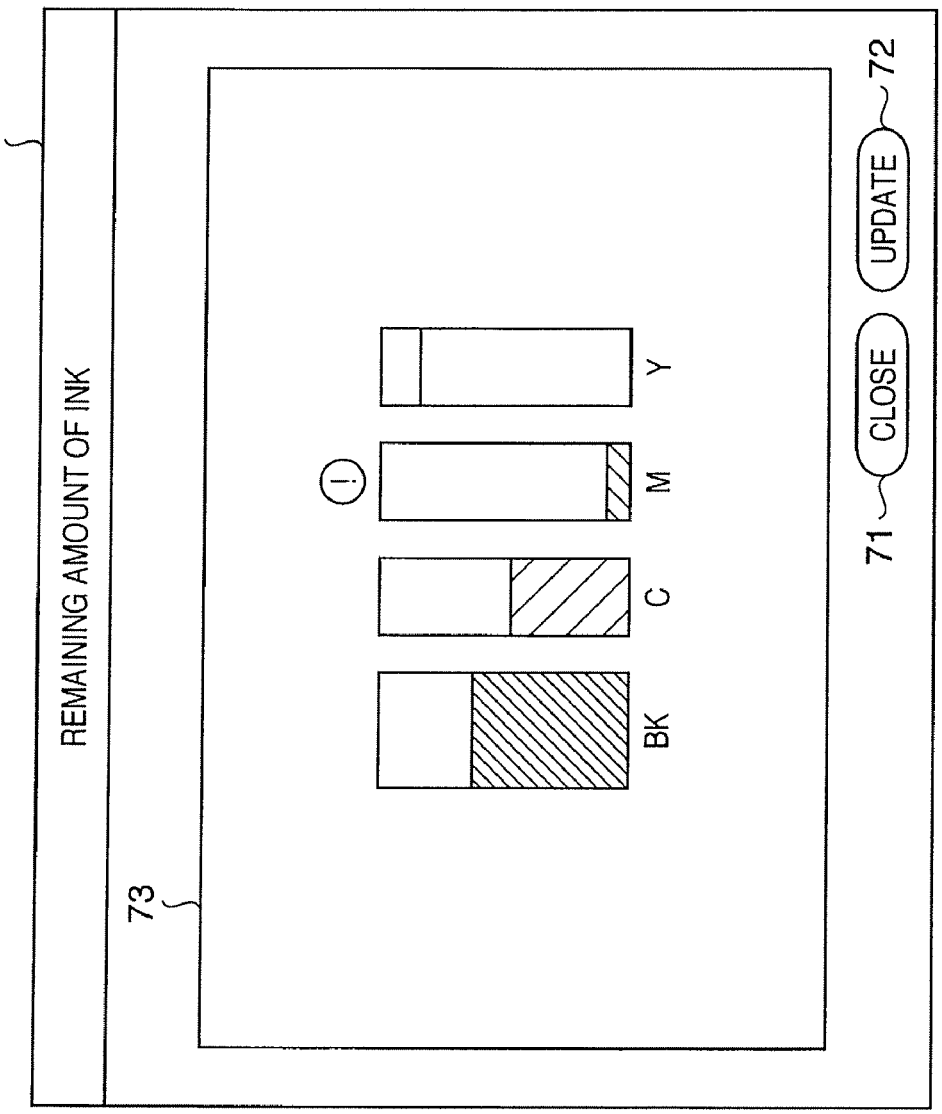
FIG. 6 is a diagram showing a remaining ink display screen of the printer utility.

FIG. 6 is a remaining ink display screen for displaying the remaining ink, displayed when the remaining ink checking execution button 66 is pressed in the execution function selection screen 60 shown in FIG. 5. A remaining ink amount display screen 70 comprises a "close" button 71, an update button 62, and a remaining ink level display unit 73. When the "close" button 71 is pressed, the printer utility 06 closes the present screen and returns to the screen shown in FIG. 5. When the update button 72 is pressed, the printer utility 06 obtains the status showing the remaining ink from the printer, and re-displays the remaining ink level on the remaining ink level display unit 73 based on that status. In addition, when displaying the remaining ink level display screen 70 after pressing the checking execution button 66, the printer utility 06, as when the update button 72 is pressed, displays the remaining ink level based on the status obtained from the printer on the remaining ink level display unit 73.

<Maintenance Processing>

Figure 7:
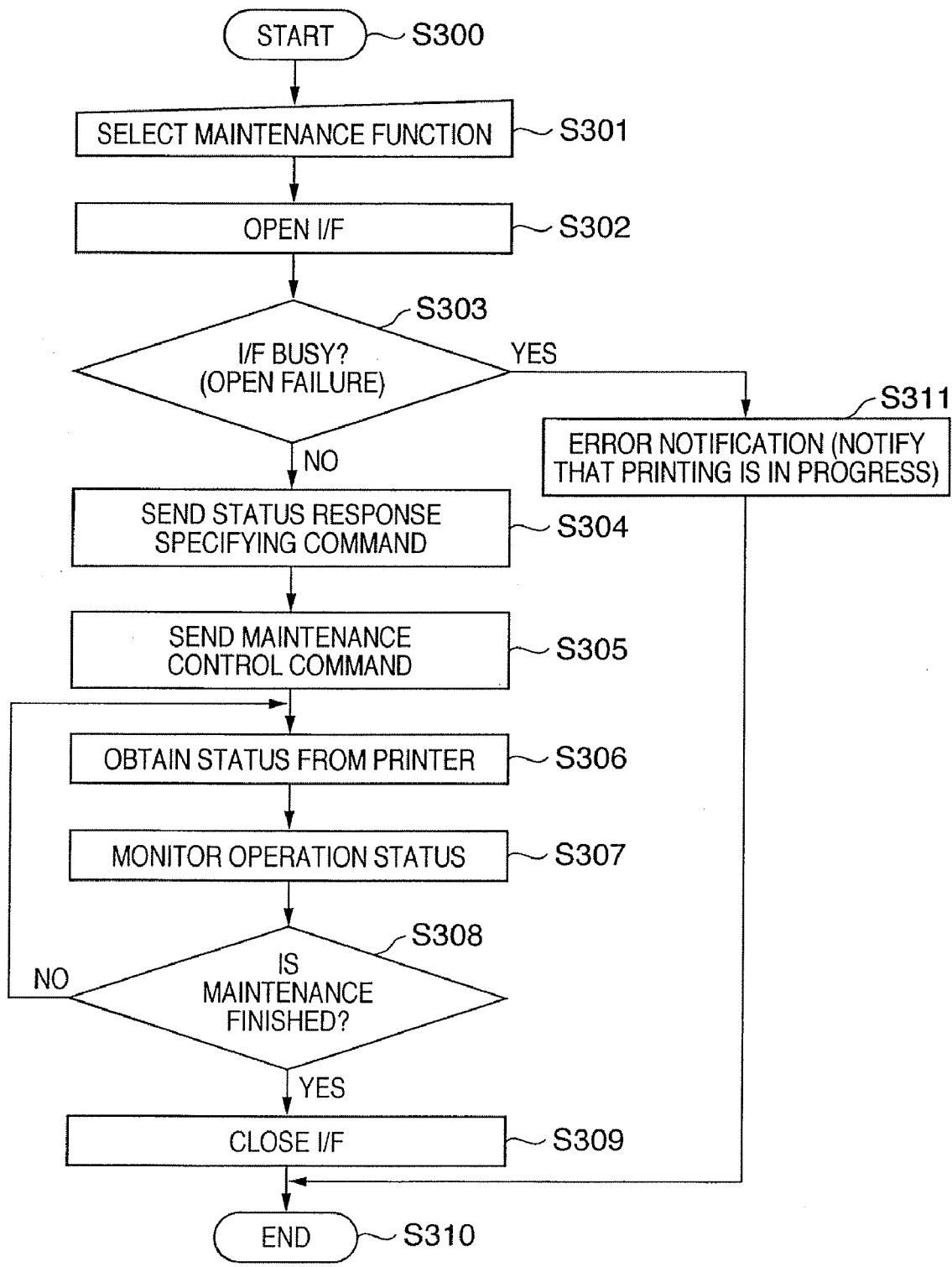
FIG. 7 is a diagram showing the processing flow when executing a maintenance function of the printer utility.

FIG. 7 shows the process flow of executing the maintenance function in the printer utility 06. That is, FIG. 7 shows the process flow when executing cleaning, intense cleaning, nozzle check pattern printing, and head position adjustment function through the execution function selection screen 60 shown in FIG. 5.

Step S301 involves the receiving of execution instructions by the user for the desired maintenance functions. When there are execution instructions, the process advances to Step S302. At Step S302, the opening of the interface selected at Step S202 of FIG. 2 is attempted. In the present embodiment, when the printer driver is using a certain interface and carrying out printing, the interface cannot be opened. The interface enters an occupied state by the process executing processing by the printer driver 03, and enters a busy state. At Step S303, it is determined whether the interface is in a busy state and open processing has failed. If it is determined that the interface is not in a busy state and that the interface was opened, the process advances to Step S304.

At Step S304, a command for specifying the return status is sent to the selected printer. At Step S305, a control command specifying the execution of the maintenance function instructed at Step S301 is sent to the printer.

Next, the status of the printer is obtained (Step S306), and the finishing of maintenance processing, based on the information showing the operational state of the printer included in the obtained status, is monitored (Step S307). Then, at Step S308, when it is determined that maintenance has finished, the interface is closed (Step S309), and the process is ended. At Step S308, when it is determined that maintenance is not finished, the process returns to Step S306.

When it is determined at Step S303 that the interface is in a busy state and cannot be opened, the process advances to Step S311. Then, after, for example, displaying to the user the fact that execution of the maintenance function for printing cannot be carried out, the process is ended.

<Remaining Ink Confirmation Processing>

Figure 8:
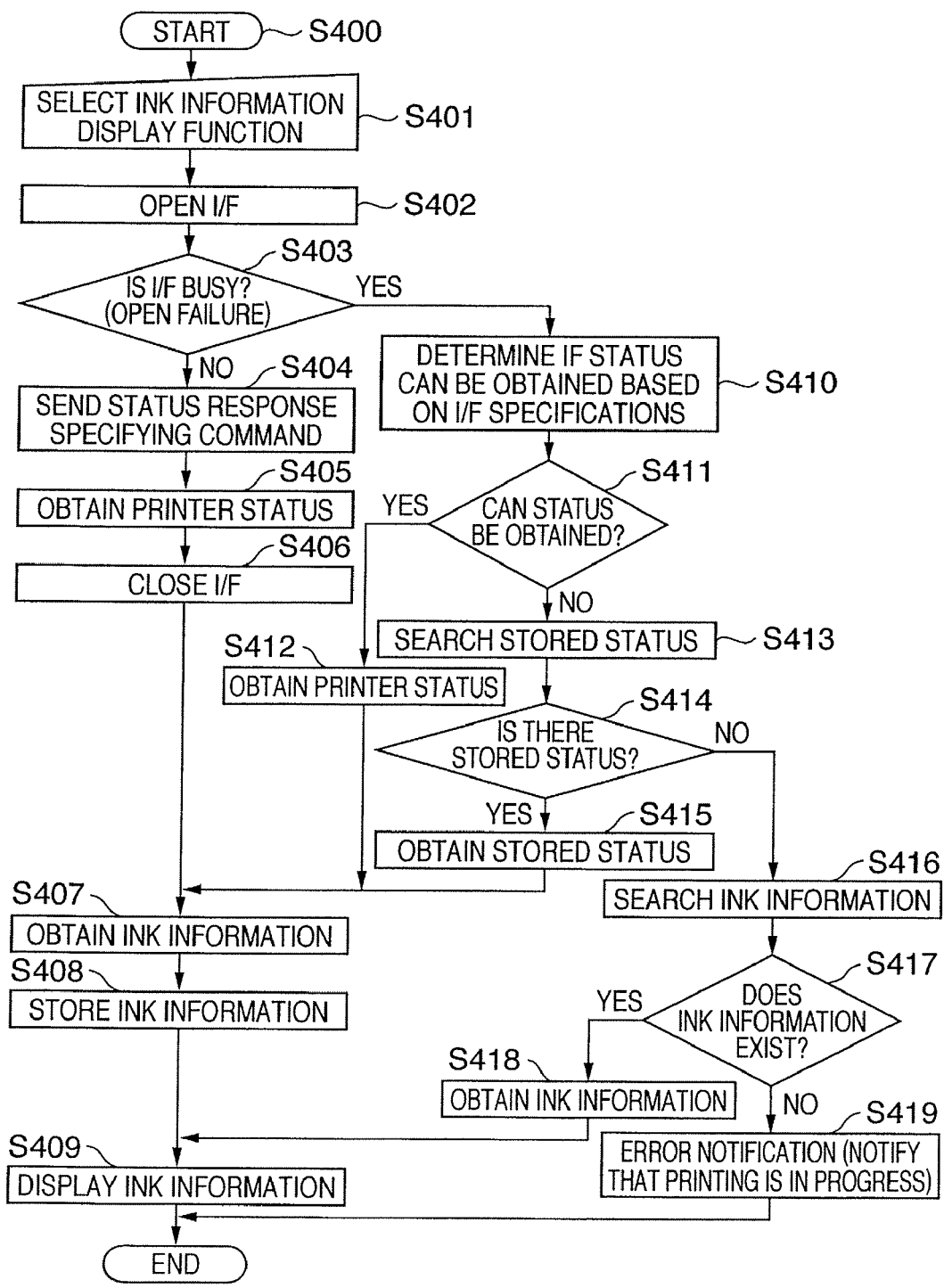
FIG. 8 is a diagram showing the processing flow when executing a remaining ink display function of the printer utility.

FIG. 8 shows the processing flow of executing the function for confirming the state of the printer in the printer utility. That is, in the execution function selection screen shown in FIG. 5, the processing flow when pressing the remaining ink checking execution button 66 and executing the remaining ink display function is shown.

At Step S401, when an instruction to execute the remaining ink level display function is received, the process advances to Step S402. At Step S402, opening of the selected interface is attempted. At Step S403, it is determined whether the interface is in a busy state and open processing has failed. Here, the interface is in a busy state when the printer selected by the utility via FIG. 4 and the printer used by the printer driver match, and the interface being used also matches. When it is determined that the interface is not in a busy state and could be opened, the process advances to Step S404. At Step S404, a command specifying the return status is sent to the printer. Next, the printer obtains the status (Step S405), and closes the interface (Step S406).

Then, at Step S407, information showing the remaining ink level included in the obtained status is obtained, and that information is stored in the printer utility information storage unit 07 (Step S408). The obtained remaining ink level information is stored as a remaining level store file which has the model name of the printer which is the source of the status information, the communication interface, and a value unique to the printer. Here, as a value unique to the printer, the serial number is stored in the case where the communication interface is a USB, the MAC address is stored in the case where the communication interface is Ethernet (Registered Trademark), and GUID is stored in the case of IEEE1394. The data structure of the remaining level store file will be described below. Moreover, when the remaining level store file related to a printer whose status has been obtained in Step S405, is already stored in the printer utility information storage unit 06, that remaining level store file is overwritten by a new remaining level store file. That is, if the same printer model name, communication interface, and value unique to a printer are already stored, that remaining ink level information and store time are overwritten.

When the process advances to Step S409, a screen shown in FIG. 6 is displayed based on the obtained information indicating the remaining ink level. Processing is then ended.

On the other hand, in Step S403, when it is determined that the interface is in a busy state and could not be opened, the process advances to Step S410. At Step S410, a determination is made on whether a printer status can be obtained in the busy state based on the specification (type) of communication interface selected at Step S202 of FIG. 3. This determination in Step S410 makes it possible to separate the process of Steps S412 and S413 to be described below. In the present embodiment, when the communication interface is a local interface such as a USB or an IEEE1394, it is determined that the status of the printer cannot be obtained due to being in a busy state. In addition, it is determined that the status can be obtained when the communication interface is a network interface such as Ethernet (Registered Trademark). When obtaining the status by Ethernet (Registered Trademark) in the busy state, a UDP (User Datagram Protocol) channel is used (Step S412). When not in a busy state, the TCP/IP (Transmission Control Protocol/Internet Protocol) channel is used (Step S405). Obtaining the status by TCP/IP guarantees a response from the printer, and therefore is a more desirable format. In addition, when the specification (type) of interface is FireWire, etc., the determination is "NO" in Step S411. Also, in FIG. 10 and FIG. 11, both of which are described below, there is no detailed description of the manner in which the status is stored for FireWire (Registered Trademark). However, as with USB, etc., the printer model, communication interface type, and interface serial number, etc., are stored as the status.

If it is determined at Step S411 that a status can be obtained, the status is obtained from the printer by the UDP format described above (Step S412). The process then advances to Step S407. At Step S411, when it is determined that the status cannot be obtained, the status stored by the printer driver 03 is searched from the printer status storage unit 05 (Step S413). Here, the printer utility 06 sets as search condition the model name of the printer, communication interface, unique printer and interface serial number value selected in Step S202 of FIG. 3. Then, the relevant status is searched from the printer status storage unit 05 based on the search conditions. For example, when the currently selected interface is a USB interface, a Key 303 of FIG. 11 is determined by the selection of 51 of FIG. 4, and, further, a Key 305 is determined by a printer selected in 52 of FIG. 4. Here, Key 303 and Key 305, and Key 203 and Key 205 correspond to one another when the printer selected in the utility via FIG. 4 and the printer being used by the printer driver match one another. Therefore, when a busy state has been determined in Step S403, the utility can search for an appropriate status from the status (FIG. 10) stored by the printer driver, based on the Key (serial number) of the interface identifier. In addition, further search methods will be described later.

At Step S414, when it is determined that there is a relevant status store file stored by the printer driver 05, the status included in the status store file is obtained (Step S415). Next, the process advances to Step S07. On the other hand, at Step S414, when it is determined that there is no status stored by the printer driver, the process advances to Step S416. At Step S416, the printer utility 06 searches for remaining ink information stored previously. The printer utility 06, using as search conditions (key) the selected printer model name, communication interface, and value unique to the printer, searches for relevant remaining ink level information out of printer utility information storage unit 07. A detailed description of the search method will be given below. At Step S417, when it is determined that there is previously stored information, information is obtained (Step S418), and the process proceeds to Step S409. When it is determined that there is no previously stored information, a notification is sent out that remaining ink level information cannot be obtained from the printer due to being in the middle of printing (Step S419), and the process is ended.

FIG. 9 is an error notification screen for notifying the user that various functions of the printer utility cannot be executed due to being in the middle of printing. An error notification screen 100 comprises a message display unit 101 and an OK button 102. On the message display unit 101 is displayed the notification contents to the user. When the OK button 102 is pressed, the screen returns to that shown in FIG. 5.

By the method shown in FIG. 8, even in an environment in which interfaces respectively used by the printer driver and the printer utility can compete with each other, the printer utility can, as much as possible, obtain the most recent printer status. In addition, because whether or not to obtain the printing apparatus status obtained and stored by the printer driver is decided at the process of Step S411 according to the type of interface, if possible the real time status of the printer can be obtained. In addition, at Step S418, because the status can be obtained even in the case of not being able to obtain the status stored in the printer status storage unit 05 by the printer driver, it is possible to, for example, obtain the status even after re-installing the printer driver. Also, since at Step 413, the necessary status is searched for according to the interface serial number, an accurate status can be obtained even when a printer of the same model is connected to two USB interfaces set up on the same PC.

<Status Store File>

FIG. 10 shows an example of a data structure of a status store file stored in the printer status storage unit 05 at Step S115 of FIG. 2. The data is structured with a key for accessing specific information and a value for storing information. In each information to be stored, there is assigned a unique key, and necessary information can be obtained by referencing the value based on the key. The value includes, within it, a low-level relation between the key and value. Along with this, it is possible to hierarchically search the value of each key using a plurality of keys.

The status store file 1001 comprises a Key 201 (printer model name) of a first level, and a Value 202 (information corresponding to each model name) corresponding to each value (model name) of the Key 201. The Value 202 (information corresponding to each model name) comprises a Key 203 (communication interface) and a Value 204 (information corresponding to each communication interface). The Value 204 (information corresponding to each communication interface) comprises a Key 205 (a value (interface serial number) unique to a printer) and a Value 206 (specific information corresponding to each printer-specific value). As a value unique to a printer, there is stored a serial number in the case of USB, GUID in the case of IEEE1394, and a MAC address in the case of Ethernet (Registered Trademark). In addition, in the present embodiment, information corresponding to a value unique to a printer comprises identification information showing information attributes, and values for each of the attributes. Information attributes are printer status and its storage time, and the identification information of these attributes comprises a Key 207. Also, in the corresponding Value 207 is stored a value (status and storage time) corresponding to each attribute.

The printer driver 03 and the printer utility 06 specify, as Key 201, the model name of the printer which has been selected or is in use, and obtains the information 202 corresponding to the relevant model from among files of the printer status storage unit 05. Next, the communication interface being selected or in use is specified as a Key 203 based on the obtained information 202, and the information 204 corresponding to the relevant communication interface is obtained. Further, a value unique to the printer is set as a Key 205 based on the obtained information 204, and the relevant information 206 is obtained. In the information 206 is stored the status of the printer in operation and the status storage time after being matched with their respective attribute identification information. Here, the status of the printer to be operated and its storage time is read out and obtained. In this way, the printer driver 03 and the printer utility 06 use in sequence the model name, communication interface, value unique to printer, and attribute value of information, as the Key. In doing so, the status of the printer to be operated and the status storage time is obtained from the status store file in which information has been hierarchically stored. In Step S110 of FIG. 2 and Step S413 of FIG. 8, status information stored in this manner is obtained. In addition, in Step S115 of FIG. 2, status information is stored in the format of FIG. 10.

<Remaining Ink Level Store File>

FIG. 11 shows an example of the data structure of the remaining ink level store file stored in the printer utility information storage unit 07. As with the file stored in the printer status storage unit 05, the data is structured by a Value storing a Key and information for accessing specific information. The data is structured by a Key 301 and a Value 302 storing the printer model name and a plurality of information corresponding to the printer model name. Each information corresponding to the model name is structured by a Key 303 and Value 304, both of which store a communication interface and a plurality of information corresponding to the communication interface. Further, each information is structured by a Key 305 (interface serial number) and Value 306 which store a value unique to a printer and information specific to that printer. In the present embodiment, as specific information, a set (Key 307, Value 308) of a plurality of Key-Value showing the color of the ink and the level of remaining ink is stored. The printer utility successively uses the model name, communication interface, value unique to the printer, and ink color as a Key, and obtains the remaining ink level of each color in the printer to be used out of data in which information has been hierarchically stored.

The structure of the remaining ink level store file of FIG. 11 is different in the content of the status store file of FIG. 10 and the Value 306, but the other structure is the same. In the Value 306 is stored, as a percentage of 100%, the ink color as an information attribute. Therefore, the method of searching using a key is the same.

By the above structure and steps, it is possible to display, by a printer utility, the remaining ink level of a printer being used for the current printing, even in the case of the driver and utility being program modules independent from one another. The remaining ink level that is displayed is based on the most updated information obtained from the printer in use, so from a practical standpoint there is sufficient reliability.

In addition, in the present embodiment, the remaining ink level is monitored, but the technology of the present embodiment can be applied to monitoring things which have a limitation on number, such as a form, toner, remaining battery level, remaining level of licensed copies, and other articles of consumption.

In addition, the determination step (determination means) for determining the state of the interface for obtaining the status from the printing apparatus corresponds to Step S403 and Step S503.

In the determination step (means), if the interface state is not in an occupied state, the step (means) for obtaining the status of the printing apparatus via the interface corresponds to Step S405.

If the interface state in the determination step (means) is in an occupied state, the obtaining step (obtaining means) for obtaining the status of the printing apparatus obtained and stored by the printer driver, corresponds to Steps S413 through S415.

<Second Embodiment>

A second embodiment which implements the present invention will be described in detailed with reference to the drawings. In the first embodiment of the present invention, if the status cannot be obtained from the printer when executing the remaining ink level display function in the printer utility, the printer driver searches for the stored status. When there is no status stored in the printer driver, information to display the remaining ink level was obtained from the information stored previously by the printer utility. In the second embodiment, when the printer driver does not have a stored status, or when the printer driver can obtain a stored status but the information is old, waiting occurs until the printer driver stores a new status. After waiting, information for showing the remaining ink level from the new status is obtained.

The configuration of the printing system, the various screens displayed in the printer utility, and the data structure of files to be stored in the printer status storage unit 05 are the same as in the first embodiment. In addition, the various processing flows of the printer driver and printer utility, excepting the processing flow of when the remaining ink level display function is executed, is the same as in the first embodiment.

Figure 12:
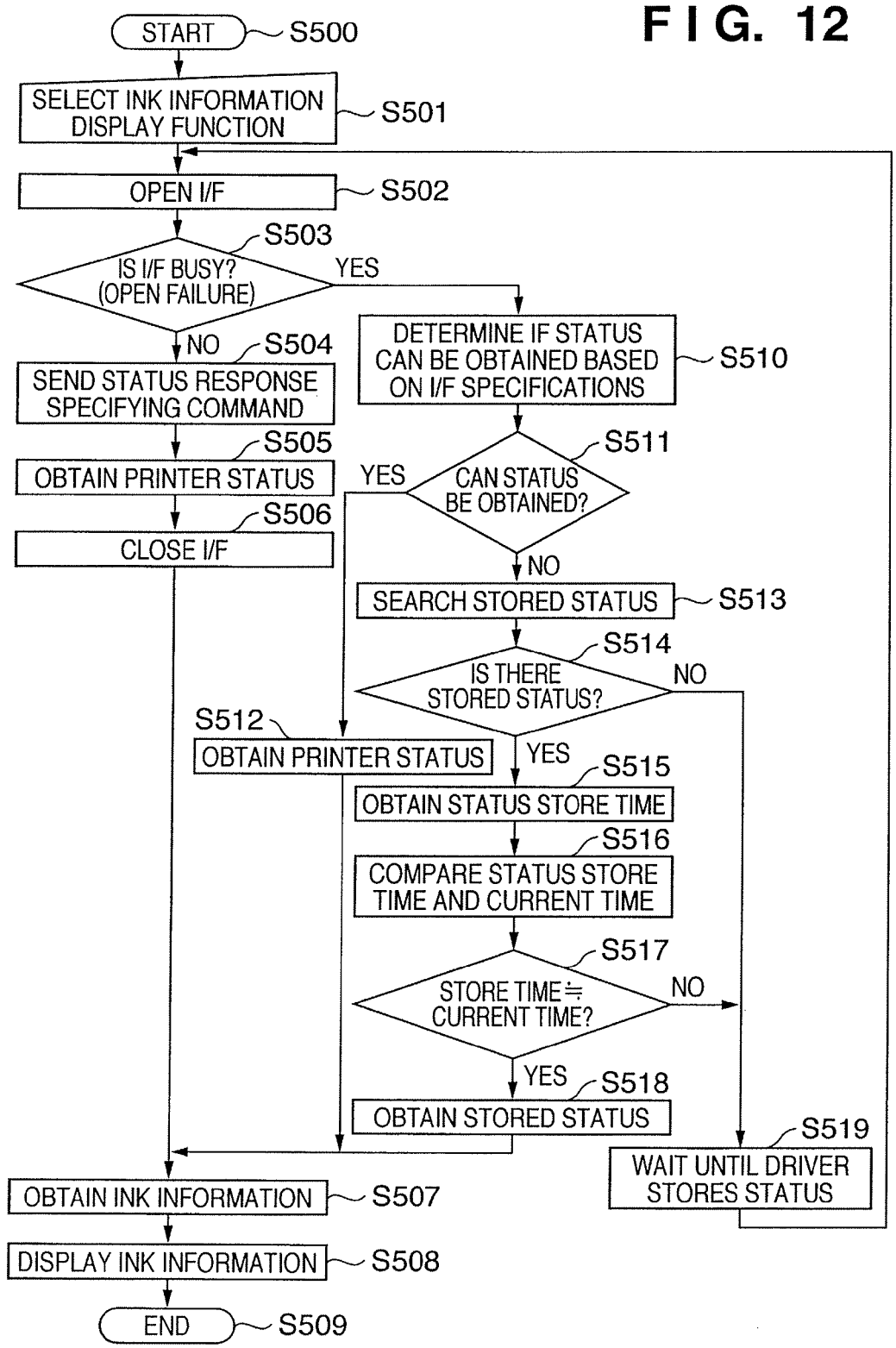
FIG. 12 is a diagram showing the processing flow when executing the remaining ink display function of the printer utility.

FIG. 12 shows a processing flow of when executing the function of confirming the status of the printer in the printer utility. That is, in the execution function selection screen 60 shown in FIG. 5, the processing flow of when the confirmation button 66 for confirming the remaining ink level is pressed and the remaining ink level display function is executed, is shown. In addition, the process of each step shown in FIG. 12 is, with the exception of Steps S515 through 517, and S519, basically the same as each step described in FIG. 8.

In Step S501, when an execution instruction for the remaining ink level display function is received, the process advances to Step S502. In Step S502, opening of the selected interface is attempted. In Step S503, it is determined whether open processing has failed when the interface is in a busy state. If the interface is not in a busy state, and it is determined that opening was successful, the process advances to Step S504. At Step S504, a command specifying the return status is sent to the printer. Next, the printer status is obtained (Step S505), and the interface is closed (Step S506). Then, at Step S507, information indicating the remaining ink level in an obtained status is obtained, and after displaying the screen showing FIG. 6 based on that information, the process is ended.

At Step S503, when it is determined that the interface is in a busy state and cannot be opened, the process advances to Step S510. At Step S510, it is determined whether the status of the printer can be obtained in the busy state, based on the specification of the communication interface selected at Step S202 of FIG. 3. In the present embodiment, when the communication interface is a USB or IEEE1394, it is determined that the status cannot be obtained due to being in a busy state, and when the communication interface is Ethernet (Registered Trademark), it is determined that the printer status can be obtained. When the status is obtained by Ethernet (Registered Trademark) in a busy state, the UDP (User Datagram Protocol) channel is used. When not in a busy state, the TCP/IP (Transmission Control Protocol/Internet Protocol) channel is used.

At Step S511, when it is determined that the status can be obtained, the status is obtained from the printer (Step S512) and the process advances to Step S507. At Step S511, when it is determined that the status cannot be obtained, the status stored by the printer driver and which corresponds to the selected printer and interface is searched from the printer status storage unit 05 (Step S513). Search processing is the same as in the first embodiment. At Step S514, if it is determined that there is no status which is stored by the print driver and which corresponds to the search condition, the process advances to Step S519. Then, after being in waiting mode until the printer driver stores a status, the process returns to Step S502. In the present embodiment, the waiting time until the printer driver stores the status is set, as an example, to 1 second, but a different wait time is also possible.

At Step S514, when it is determined that there is a relevant status stored by the printer driver, the process advances to Step S515. At Step S515, the time at which the printer driver stored a status is obtained, and the status store time and current time are compared (Step S516). At Step S517, if it determined that the elapsed time from the time that status was stored and the present time is below a specific amount of time, and the information included in the status shows the state of the printer at nearly the current time, that status is obtained Step S518), and the process advances to Step S507. At Step S517, if the elapsed time from the time the status was stored and the current time is equal to or greater than a specific amount of time, there is waiting until the printer driver stores the status (Step S519), and the process returns to Step S502. In the present embodiment, as an example of the elapsed amount of time, which serves as a standard to determine whether or not the status information shows the current printer state, a determination is made based on whether 3 or more seconds have elapsed from the time of saving the status. The amount of time, which serves as the basis for making a determination, can be freely decided, but since the reliability of the status decreases as the amount of time elapsed since last storing the status increases, it is desirable for the elapsed time to not be excessively long.

By the configuration and steps above, according to the printing system of the present embodiment, even if the driver and utility are program modules that are independent from one another, it is possible to display, using the printer utility, the remaining ink level of the printer being used for current printing. Further, since it is ensured that the displayed remaining ink level information has been obtained within a specific time period from the present time, the remaining ink level has high reliability. Also, even when the interface with the printer is occupied by a printer driver, there is waiting until the most updated status is obtained by the printer driver, thereby ensuring the an remaining ink level information of high reliability can be obtained.

<Third Embodiment>

A third embodiment implementing the present invention will be described with reference to drawings. In the first embodiment of the present invention, if the printer driver is in the middle of printing when executing the maintenance function by the printer utility, and the interface was in a busy state, a notification that a maintenance function could not be executed due to being in the middle of printing was sent and the process was ended. In the third embodiment, even if the interface is in a busy state, if it can be determined that the printing process can be ended within a specific time period, waiting mode is entered until printing is finished, and the execution of the maintenance function is retried.

The structure of the printing system, various screens displayed by the printer utility, and the data structure of the files to be stored in the printer status storage unit 05 and the printer utility information storage unit 07 are the same as in the first embodiment of the present invention. In addition, the various processing flows of the printer driver 03 and the printer utility 06, excluding the processing flow of when the maintenance function has been executed, are the same as in the first embodiment of the present invention.

Figure 13:
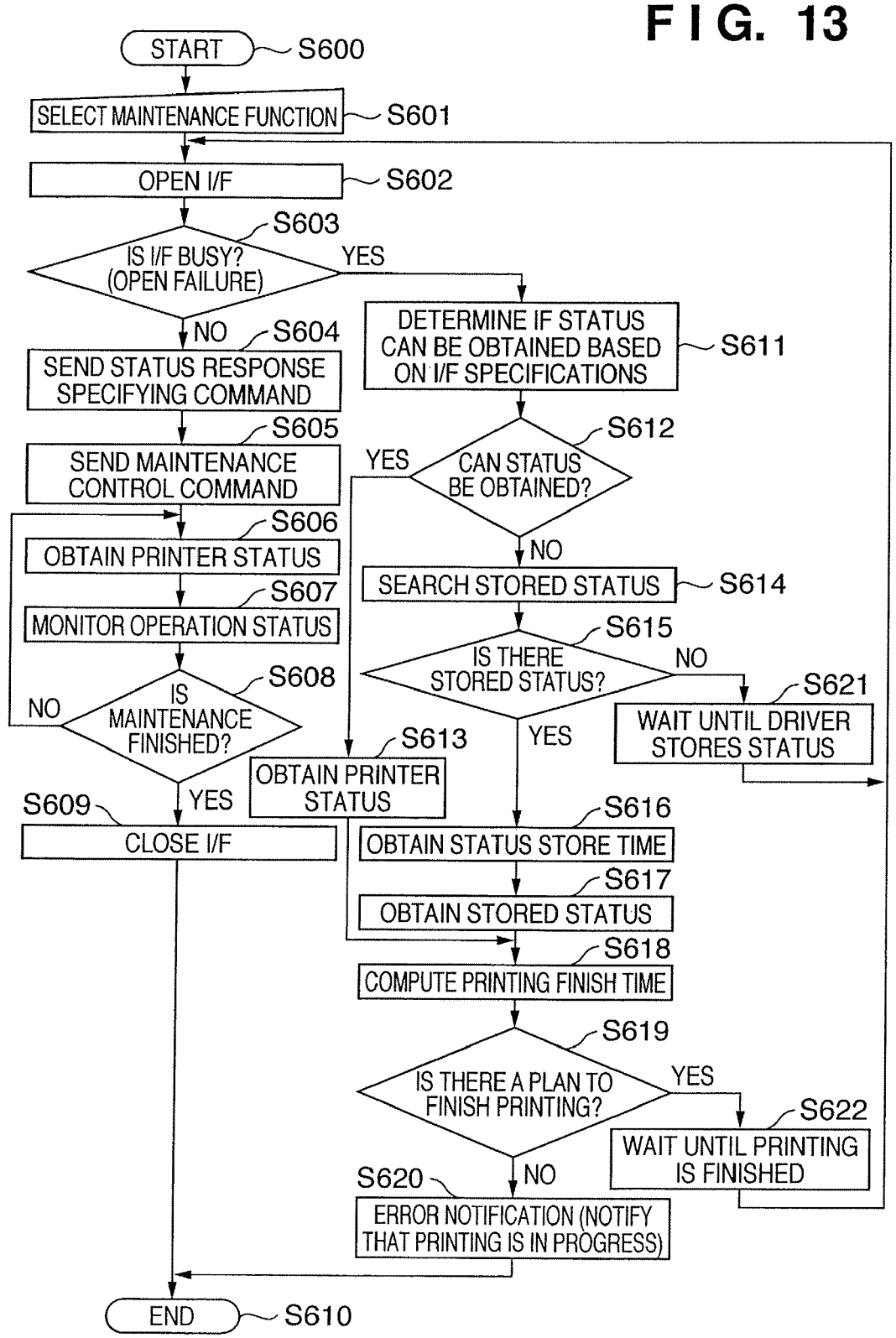
FIG. 13 is a diagram showing the processing flow when executing the maintenance function of the printer utility.

FIG. 13 shows a processing flow of when the maintenance function in the printer utility. That is, in the execution function selection screen 60 shown in FIG. 5, the processing flow of when cleaning or intense cleaning, nozzle check pattern printing, or head position adjustment function have been executed is shown. In addition, the process of each step shown in FIG. 13 are, with the exception of Steps S616 and S619 through S621, basically the same as each step described in FIG. 8.

When the execution of the desired maintenance function is instructed at Step S6101, the process advances to Step S602. At Step S602, the opening of the interface is attempted. At Step S603, it is determined whether open processing has failed when the interface is in a busy state. When it is determined that the interface is not in a busy state, and opening was possible, the process advances to Step S604.

At Step S604, a command specifying the return status is sent to the printer, and in Step S605, a control command specifying the execution of maintenance function instructed at Step S601 is sent to the printer. Next, the printer status is obtained (Step S606), and the ending of maintenance processing is monitored (Step S607) based on information showing the operation state of the printer included in the obtained status. Then, at Step S608, when it is determined that maintenance has finished, the interface is closed (Step S609), and the process is ended. At Step S608, when it is determined that maintenance is not finished, the process returns to Step S606.

On the other hand, when it is determined at Step S603 that the interface is in a busy state and could not be opened, the process advances to Step S611. At Step S611, it is determined whether it is possible to obtain the status of the printer in a busy state based on the specification of the communication interface selected at Step S202 of FIG. 3. In the present embodiment, it is determined that when the communication interface is USB or IEEE1394 and in a busy state, the printer status cannot be obtained, and when the interface is Ethernet (Registered Trademark), the status can be obtained. The obtaining of the status by Ethernet (Registered Trademark) in the busy state is performed by the UDP (User Datagram Protocol) channel. When not in a busy state, the obtaining of the status is carried out by the TCP/IP (Transmission Control Protocol/Internet Protocol) channel.

At Step S612, when it is determined that the status cannot be obtained, the status stored by the printer driver 03 corresponding to the selected printer and interface are searched from the printer status storage unit 05 (Step S614). The search process is the same as in the first embodiment of the present invention. At Step S615, when it is determined that there is no status corresponding to the search condition stored by the printer driver, the process advances to Step S621. Then, after being in waiting mode until the printer driver stores the status, the process returns to Step S602. In the present embodiment, a 1 second wait period is given as an example of the waiting period until the printer driver stores the status, but the waiting period is an arbitrary value. Since the reliability of the stored status decreases as the elapsed period after last storing the status increases, it is desirable for the elapsed time to not be too long.

At Step S615, when it is determined that there is a status stored by the printer driver and corresponding to the search conditions, the storage time of the status is obtained (Step S616), the status stored by the printer driver is obtained (Step S617), and the process advances to Step S618. At Step S612, when it is determined that the status can be obtained, the status is obtained from the printer (Step S613), and the process advances to Step S618.

At Step S618, the time until printing is finished is calculated based on various information showing the printing state such as the total printing page number in the obtained status or page number currently being processed. In the case of calculating the time until printing is finished based on the status stored by the printer driver 03, calculation is carried out with the status storage time in consideration. For example, the required amount of time required until printing is finished is calculated based on the stored status. The time until printing is finished is calculated as the value of subtracting from the required time that difference in time between the current time and the status storage time.

At Step S619, if the time until printing is finished is more than a certain amount of time, a notification is sent that the maintenance function cannot be executed due to being in the middle of printing (Step S620), and the process is ended. At Step S619, if the time until printing is finished is below a specific period of time, the process advances to Step S622, and, after being in waiting mode until the time printing is finished, the process returns to Step S602. In the present embodiment, whether or not the time until printing is finished is below 1 minute is given as an example of the time serving as a basis for determining whether to wait until printing is finished. However, the time which serves as a basis for determination can be some other value. However, if the standard time is too long, the wait time also becomes too long, and a wait time that is too long is not desirable.

According to the above structure and steps, maintenance of the printer currently in use can be easily achieved by the utility corresponding to the occupied printer of the printer driver interface is in wait mode until the end of occupation by the driver. For this reason, by leaving the printer without performing maintenance, the possibility that the printer is blocked will be lowered.

As described above, the embodiment of the current invention anticipated an inkjet printer as a printer which is one structural element of the printing system, it is not limited to this example, and a printing apparatus including a facsimile machine or multifunction peripheral can be used if wished. In addition, it is possible to apply the present invention to a printer using an electrophotographic method.

Further, the printing system according to the embodiments of the present invention are not individual apparatuses, but have a structure in which a PC and a printer are connected to each other via a specific interface. However, the present invention is not limited to this, and a printing system in which the functions of both a PC and printer are combined as one unit may be used.

In addition, the present invention can be applied to a system comprising a plurality of devices (e.g., host computer, interface device, reader, printer, etc.) or to a system comprising one device (e.g., a multifunction peripheral, facsimile device, etc.) In addition, the object of the present invention is achieved by supplying a storage medium recording program code for implementing the functions of the above embodiments to a system or apparatus, and reading out and executing the program code stored in the storage medium by the computer of that system or apparatus. In this case, the program code itself which was read out from the storage medium can implement the functions of the above embodiments, and the program code and the storage medium storing the program code comprise the present invention.

In addition, the present invention includes the case of the functions of the above embodiments being realized by an operating system (OS) operating on a computer performing a part or all of the actual processing. Further, the present invention is applied even in the case of the program code read out from the storage medium being written into the memory equipped to the function expansion unit connected to a computer or a function expansion card inserted into a computer. In this case, the functions of the above embodiments are realized by a process in which, based on the instructions by the program code which has been written, a CPU equipped to a function expansion card or function expansion unit performs part or all of the actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188696, filed on Jul. 7, 2006, which is hereby incorporated by reference herein in its entirety.

What is claimed is:

1. A control method of obtaining a status of a printing apparatus, wherein the method is executed by a printer utility installed in an information processing apparatus having an operating printer driver that can obtain and store a status from the printing apparatus, comprising:
   a first determination step of determining a state of an interface for obtaining a status from the printing apparatus; and
   a second determination step of determining a type of the interface for obtaining status from the printing apparatus;
   an obtaining step of switching a method for obtaining a status of the printing apparatus based in part on the type of the interface, and of obtaining the status of the printing apparatus, such that the status is obtained from the printing apparatus by sending a command for obtaining the status via the interface regardless of whether or not the status is stored by the printer driver if it is determined that either in said first determination step that the interface is not in an occupied state or if it is determined in said second determination step that the interface is a network interface, and
   wherein the status is obtained by obtaining a status of the printing apparatus obtained and stored by the printer driver without sending the command via the interface if it is determined in said first determination step that the interface is in an occupied state and it is determined in said second determination step that the interface is a local interface.

2. The method according to claim 1, wherein said obtaining step obtains, in the case where the printer utility is not able to obtain the status of the printing apparatus obtained and stored by the printer driver, a status of the printing apparatus which was previously obtained and stored.

3. The method according to claim 1, wherein said obtaining step determines, in the case where it is determined in said first determination step that the interface is in an occupied state, whether or not to obtain the status of the printing apparatus obtained and stored by the printer driver, based on the interface type.

4. The method according to claim 1, wherein the printer driver stores an interface identifier uniquely specifying the interface and the status obtained from the printing apparatus in association with each other, and said obtaining step searches for a stored status based on the interface identifier.

5. An information processing apparatus in which a printer driver that can obtain a status from a printing apparatus operates, comprising:
   a first determination unit constructed to determine a state of an interface for obtaining a status from the printing apparatus; and
   a second determination unit constructed to determine a type of the interface for obtaining a status from the printing apparatus;
   an obtaining unit constructed to switch a method for obtaining a status of the printing apparatus based in part on the type of the interface and to obtain the status of the printing apparatus, such that the status is obtained from the printing apparatus by sending a command for obtaining the status via the interface regardless of whether or not the status is stored by the printer driver if either said first determination unit determines that the interface is not in an occupied state or if said second determination unit determines that the interface is a network interface, and
   wherein the status is obtained by obtaining to obtain a status of the printing apparatus obtained and stored by the printer driver without sending the command via the interface if said first determination unit determines that the interface is in an occupied state and said second determination unit determines that the interface is a local interface.

6. The apparatus according to claim 5, wherein said obtaining unit obtains, in the case where the status of the printing apparatus obtained and stored by the printer driver cannot be obtained, a status of the printing apparatus which was previously obtained and stored.

7. The apparatus according to claim 5, wherein said obtaining unit determines, in the case where said first determination unit determines that the interface is in an occupied state, whether or not to obtain the status of the printing apparatus obtained and stored by the printer driver, based on the interface type.

8. The apparatus according to claim 5, wherein the printer driver stores an interface identifier uniquely specifying the interface in association with the status obtained from the printing apparatus, and said obtaining unit searches for a stored status based on the interface identifier.

9. A non-transitory computer-readable medium on which a program is embodied, for causing a computer to function as an information processing apparatus according to claim 5.

* * * * *